July 6, 1937.  M. A. LEHMANN  2,085,985
LATHE CARRIAGE FEED MECHANISM
Filed May 9, 1936  2 Sheets-Sheet 1
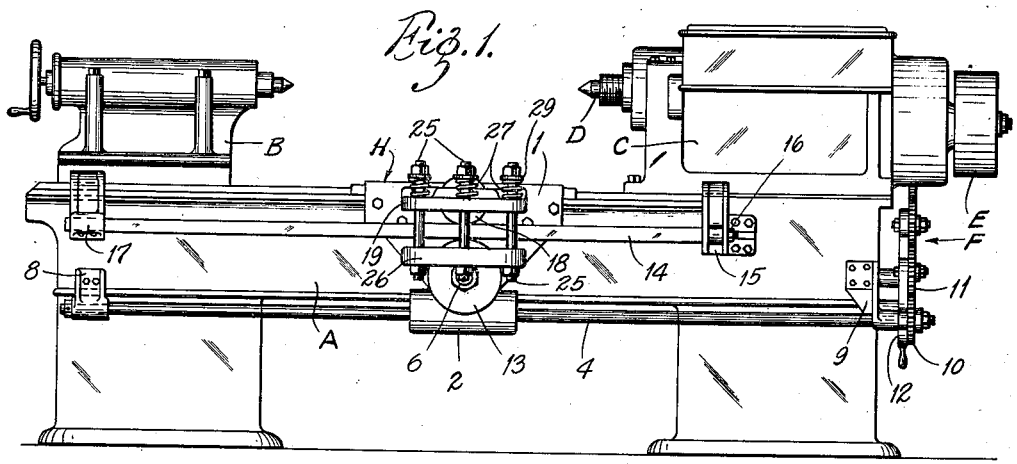
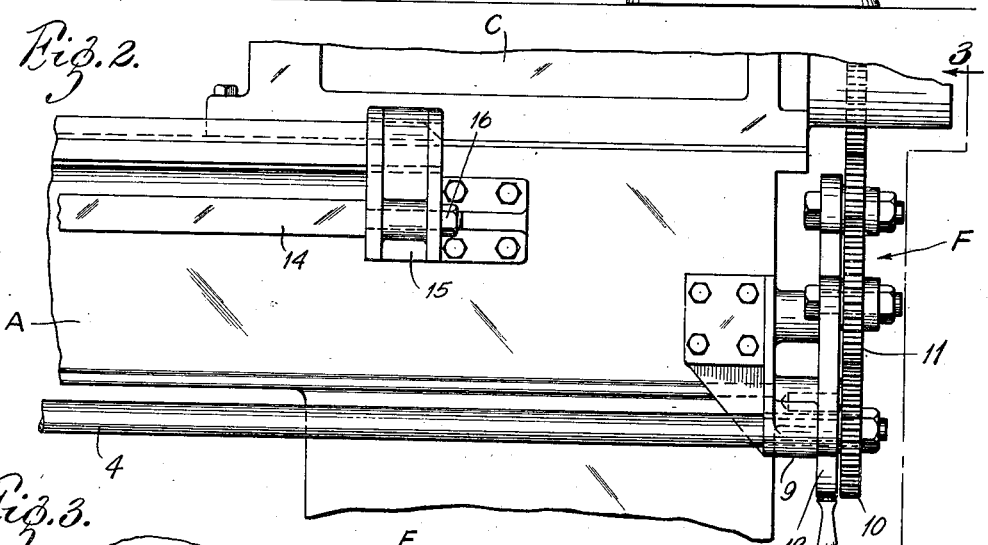
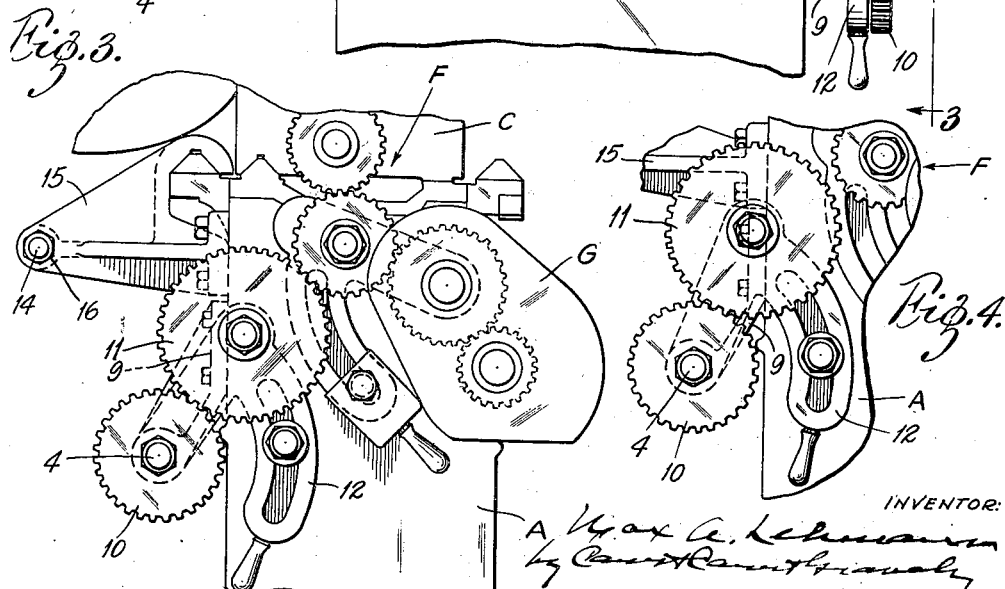
INVENTOR:
Max A. Lehmann
HIS ATTORNEYS

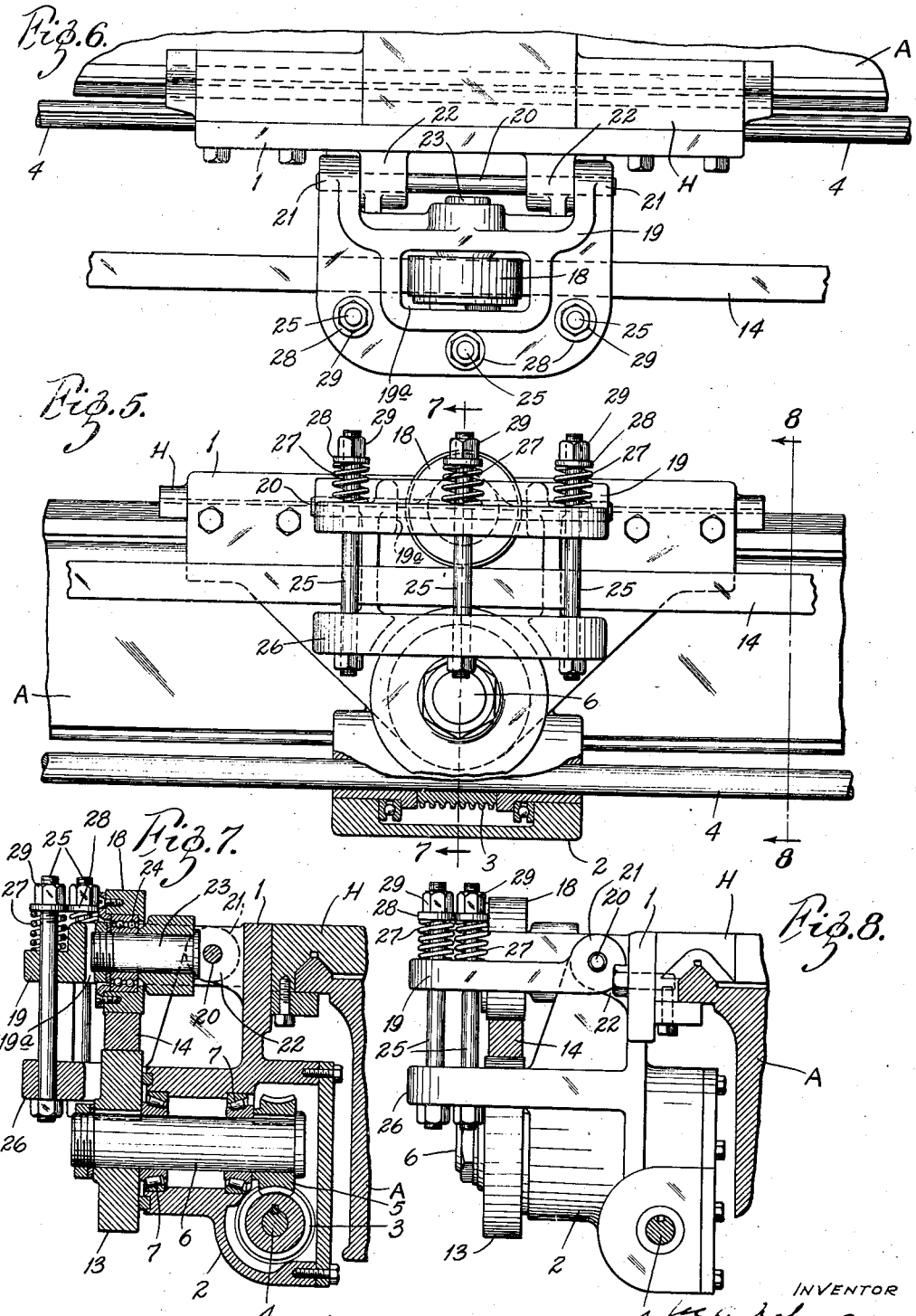

Patented July 6, 1937

2,085,985

UNITED STATES PATENT OFFICE 2,085,985

LATHE CARRIAGE FEED MECHANISM

Max A. Lehmann, Richmond Heights, Mo., assignor to Lehmann Machine Company, St. Louis, Mo., a corporation of Missouri Application May 9, 1936, Serial No. 78,820

18 Claims. (Cl. 82—21)

This invention relates to the carriage feed mechanism of a lathe or similar machine. At the present time, the common type of lathe is equipped with a lead screw for feeding the carriage when cutting threads. A practical disadvantage of such a lead screw carriage feed is the difficulty encountered in cutting screws with the desired lead or pitch of thread due to the wear of the lead screw and the feed nut for operatively connecting the carriage thereto. The principal object of the present invention is to provide a carriage feed mechanism which will overcome the above disadvantage. Other objects are simplicity and cheapness of construction and compactness of design. The invention consists in the carriage feed mechanism and in the construction, combinations and arrangements of parts hereinafter described and claimed.

In the accompanying drawings, which form part of this specification and wherein like symbols refer to like parts wherever they occur, Fig. 1 is a rear elevation of a lathe equipped with a carriage feed mechanism embodying my invention, Fig. 2 is an enlarged fragmentary rear elevation of the headstock end of the lathe, Fig. 3 is an end elevation of the parts shown in Fig. 2, with the carriage feed mechanism shown in operative position, Fig. 4 is a fragmentary end view similar to Fig. 3, with the carriage feed mechanism shown in inoperative position, Fig. 5 is a fragmentary rear elevation of the lathe in the region of the carriage, Fig. 6 is a fragmentary plan view of the parts shown in Fig. 5, Fig. 7 is a vertical cross-section on the line 7—7 in Fig. 5; and Fig. 8 is a similar cross-section on the line 8—8 in Fig. 5.

Referring to the accompanying drawings, my invention is shown in connection with a lathe comprising a bed A, a tailstock B, a geared headstock C provided with a spindle D and a driving pulley E therefor, a gear train F for transmitting motion from said spindle to the usual quick change feed rod and lead screw drive gearing located in a housing G, and a carriage H mounted on ways on top of said bed for sliding movement between said headstock and said tailstock. This construction of lathe is well known and it is considered unnecessary to illustrate it in detail.

The lathe is provided, in addition to the ordinary feed rod and lead screw carriage feed, with a carriage feed mechanism comprising a bracket 1 that is bolted or otherwise rigidly secured to the rear face of the carriage H and terminates at its lower end in a housing 2 containing a worm 3, which is slidably splined on a horizontal shaft 4 that extends longitudinally of the lathe bed A, and a worm gear 5, which is located above and driven by said worm and is fixed to one end of a horizontal shaft 6 that is disposed at right angles to the worm shaft and is supported in suitable antifriction bearings 7 provided therefor in said housing. The worm shaft 4 extends from end to end of the lathe bed A and is journaled in the tailstock and headstock ends thereof in brackets 8 and 9, respectively. This worm shaft 4 is driven from the gear train F leading from the headstock spindle to the quick change gear box G by means of a gear 10, which is fixed to the headstock end of said shaft and intermeshes continuously with a gear 11 mounted in a quadrant 12 mounted for swinging movement about the axis of said shaft for moving the gear 11 into and out of mesh with one of the gears of said gear train. The worm shaft may be driven at different speeds by compounding said gears.

The worm gear shaft 6 extends beyond the supporting housing 2 therefor in the bracket 1 on the carriage G and has a roller or wheel 13 fixed thereto adapted for rolling frictional contact with the underside of a horizontal way or traction bar 14 of rectangular cross-section that extends longitudinally of the rear side of the lathe bed. One end of the bar or rail 14 is supported in a bracket 15 fixed to the rear face of the lathe bed and is reduced to form a shoulder at one end of said bracket and threaded to receive a nut 16 at the other end of said bracket, thereby preventing endwise movement of said bar. The other end of said bar rests in an upwardly opening notch in a bracket 17 fixed to the rear face of the lathe bed.

A second roller or wheel 18 moves with the carriage along the upper surface of the longitudinal bar 14 and serves to hold said bar down on the carriage driving roller 13 located therebelow. This hold-down roller is rotatably supported in an opening 19a provided therefor in a support 19 that overhangs the bar 14 and is pivotally secured to the carriage for vertical swinging movement towards and away from the upper surface of said bar. The pivotal connection between the vertically movable hold-down roller support 19 and the carriage comprises a horizontal hinge pin 20 that extends through registering bores provided therefor in cooperating lugs 21 and 22 on said support and said carriage, respectively. Mounted in the hold-down roller support 19 is a stud 23 that extends into the roller receiving opening 19 in said support and rotatably supports said hold-down roller, suitable anti-friction bearings 24 being interposed between said stud and said roller.

The hold-down roller 18 is pressed downwardly against the bar or rollerway by means of a plurality of bolts 25 that extend through vertically alined holes provided therefor in a lateral flange 26 on the depending carriage bracket 1 and in the hold-down roller support 19 located thereabove. Helical compression springs 27 are sleeved on the bolts 25 between the hold-down roller support and washers 28 that are held on the upper ends of said bolts by means of nuts 29 threaded thereon. These springs exert a downward pressure on the hold-down roller support, thereby forcing the hold-down roller on the bar 14 and thus holding the latter in contact with the power driven carriage driving roller 13 located therebetween.

The hereinbefore described carriage feed mechanism has numerous advantages. The carriage 9 is driven by the travel of the power driven roller 13 thereon along the bar or way 14 which is fixed to the lathe bed against endwise movement, but may be deflected downwardly between its ends into contact with said roller by the spring-pressed hold-down roller located directly thereabove. Thus, slippage and consequent wear on the carriage driving roller is prevented and a uniform carriage feed obtained, thereby enabling a screw to be cut with a uniform and accurate lead. The carriage driving roller is driven through the worm gearing sustained by the carriage from the gear train leading from the headstock spindle to the quick change gear box; and the carriage drive can be readily connected to and disconnected from said gear train by moving the quadrant gear into and out of mesh therewith. The rate of carriage feed may be changed to cut screws of various leads by changing the spindle speed or by compounding the quadrant gears.

Obviously, the hereinbefore described construction admits of considerable modification without departing from the invention. Therefore, I do not wish to be limited to the precise construction shown and described.

What I claim is:

1. The combination of a bed, a carriage movably supported on said bed, and feed mechanism for moving said carriage along said bed comprising a way extending in the direction of the carriage feed, a roller sustained by and movable with said carriage along said way, and means for driving said roller.

2. The combination of a bed, a carriage slidably supported on said bed, and feed mechanism for sliding said carriage along said bed comprising a track bar extending in the direction of the carriage feed, a roller sustained by and movable with said carriage along said track bar, means for driving said roller, and means for holding said bar and said roller in frictional engagement.

3. The combination of a bed, a carriage slidably supported on said bed, and feed mechanism for said carriage comprising a track bar extending in the direction of the carriage feed, a roller sustained by and movable with said carriage along said track bar, means for driving said roller, and means for pressing said track bar against said roller.

4. The combination of a bed, a carriage slidable on said bed, and feed mechanism for said carriage comprising a track bar extending in the direction of the carriage feed, a roller movable with said carriage along one face of said bar, means for driving said roller, and a member movable with said carriage and bearing against the opposite face of said bar for holding the same in contact with said roller.

5. The combination of a bed, a carriage slidable on said bed, and feed mechanism for said carriage comprising a track bar extending in the direction of the carriage feed, a roller movable with said carriage along one face of said bar, means for driving said roller, and a second roller movable with said carriage and bearing against the opposite face of said track bar.

6. The combination of a bed, a carriage slidable on said bed, and feed mechanism for said carriage comprising a track bar extending in the direction of the carriage feed, a power driven roller movable with said carriage along one face of said bar, a second roller movable with said carriage along the opposite face of said bar, and spring means for pressing said second roller against said bar.

7. The combination of a bed, a carriage slidable on said bed, and feed mechanism for said carriage comprising a track bar extending in the direction of the carriage feed, a roller movable with said carriage along one face of said bar, means for driving said roller, a second roller movable with said carriage along the opposite face of said bar, a support for said second roller connected to said carriage for movement towards and away from said opposite face of said bar, and means for urging said support in the direction of said opposite face of said bar.

8. The combination of a bed, a carriage slidable on said bed, and feed mechanism for said carriage comprising a way extending in the direction of the carriage feed, a roller movable with said carriage along the lower surface of said way, means for driving said roller, a second roller movable with said carriage along the upper surface of said way, a support for said second roller connected to said carriage for movement towards and away from the upper surface of said way, and means for forcing said support downwardly to press the roller thereon against the upper surface of said way.

9. The combination of a bed, a carriage slidable on said bed, and feed mechanism for said carriage comprising a track bar extending in the direction of the carriage feed, a roller movable with said carriage along one face of said bar, means for driving said roller, a second roller movable with said carriage along the opposite face of said bar adjacent to said first mentioned roller, a support for said roller pivotally connected to said carriage for movement towards and away from said bar, and means for urging said support in the direction of said bar.

10. The combination of a bed, a carriage slidable on said bed, and feed mechanism for said carriage comprising a track bar extending in the direction of the carriage feed, a roller movable with said carriage along the lower surface of said bar, means for driving said roller, a second roller movable with said carriage along the lower surface of said bar, a support for said roller pivotally connected to said carriage for movement towards and away from the upper surface of said bar, and means for forcing said support in the direction of said bar to press said second roller thereagainst.

11. A lathe comprising a bed, a carriage slidable thereon, a spindle, means for driving said spindle, a track bar extending in the direction of the sliding movement of said carriage, a roller movable with said carriage and cooperating with said bar, and a connection between said spindle driving means and said roller for driving the latter.

12. A lathe comprising a bed, a carriage slidable thereon, a spindle, means for driving said spindle, a track bar extending in the direction of the sliding movement of said carriage, a roller movable with said carriage along one surface of said bar, a driving connection between said spindle driving means and said roller for driving the latter, and a member movable with said carriage along the opposite surface of said bar.

13. A lathe comprising a bed, a carriage slidable thereon, a spindle, means for driving said spindle, a track bar extending in the direction of the sliding movement of said carriage, a roller movable with said carriage along one surface of said bar, a driving connection between said spindle driving means and said roller for driving the latter, a member movable with said carriage along the opposite surface of said bar, and means for pressing said member against said bar.

14. A lathe comprising a bed, a carriage slidable lengthwise thereof, a spindle, means for driving said spindle, a track bar extending in the direction of the sliding movement of said carriage and supported at its opposite ends on said bed, a roller movable with said carriage and cooperating with one surface of said bar, a driving connection between said spindle driving means and said roller for driving the latter, and a roller movable with said carriage and bearing against the opposite surface of said bar.

15. The combination of a bed, a carriage slidable on said bed, and feed mechanism for said carriage comprising a track bar extending in the direction of the carriage feed, a roller movable with said carriage along the lower surface of said bar, means for driving said roller, a second roller movable with said carriage along the lower surface of said bar, a support for said second roller pivotally connected to said carriage for movement towards and away from the upper surface of said bar, and means for forcing said support towards the upper surface of said bar to press said second roller thereagainst, said last mentioned means comprising a bolt extending through openings provided therefor in said carriage and said support, a nut on the upper end of said bolt, and a spring sleeved on said bolt between said nut and the upper surface of said support.

16. A lathe comprising a bed, a carriage slidable lengthwise thereof, a spindle, means for driving said spindle, a track bar supported on said bed and extending in the direction of the sliding movement of said carriage, a roller movable with said carriage and frictionally engaging one surface of said bar, a member movable with said carriage and frictionally engaging the opposite surface of said bar, and a driving connection between said spindle driving means and said roller for driving the latter, said connection comprising a shaft journaled on said bed and extending in the direction of the carriage movement, worm gearing movable with said carriage and constituting a driving connection between said shaft and said roller, and a disengageable driving connection between said shaft and said spindle driving means.

17. A lathe comprising a bed, a carriage slidable lengthwise thereof, a spindle, means for driving said spindle, a track bar extending in the direction of the sliding movement of said carriage and supported at its opposite ends on said bed, a bracket depending from said carriage alongside of said bar, a shaft journaled in said bracket, a roller fixed to said shaft and cooperating with one surface of said bar, a drive shaft journaled on said bed and extending in the direction of the carriage travel, said shaft extending through said bracket, a worm gear mounted in said bracket and slidably splined on said drive shaft, a worm wheel fixed to said roller supporting shaft and cooperating with said worm, and a disengageable driving connection between said drive shaft and said spindle driving means.

18. A lathe comprising a bed, a carriage slidable lengthwise thereof, a spindle, means for driving said spindle, a track bar extending in the direction of the sliding movement of said carriage and supported at its opposite ends on said bed, a bracket depending from said carriage alongside of said bar, a shaft journaled in said bracket, a roller fixed to said shaft and cooperating with one surface of said bar, a drive shaft journaled on said bed and extending in the direction of the carriage travel, said shaft extending through said bracket, a worm gear mounted in said bracket and slidably splined on said drive shaft, a worm wheel fixed to said roller supporting shaft and cooperating with said worm, a disengageable driving connection between said drive shaft and said spindle driving means, a support mounted on said bracket for movement towards and away from the opposite surface of said bar, a second roller journaled on said support for cooperation with said other surface of said bar, and means for urging said support in the direction of said other surface to press said second roller thereagainst.

MAX A. LEHMANN.